US006347302B1

(12) United States Patent
Joao

(10) Patent No.: US 6,347,302 B1
(45) Date of Patent: *Feb. 12, 2002

(54) APPARATUS AND METHOD FOR PROCESSING LEASE INSURANCE INFORMATION

(76) Inventor: Raymond Anthony Joao, 122 Bellevue Pl., Yonkers, NY (US) 10703

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,778

(22) Filed: Jul. 31, 1997

(51) Int. Cl.[7] ............................................. G06F 17/60
(52) U.S. Cl. ............................... 705/4; 705/35; 705/36; 705/37; 705/38; 705/2
(58) Field of Search ................................. 705/4, 35, 36, 705/37, 38, 2

(56) References Cited

U.S. PATENT DOCUMENTS

| 4,831,526 | A | * | 5/1989 | Luchs et al. | 705/4 |
| 4,965,821 | A | * | 10/1990 | Bishop et al. | 705/4 |
| 5,613,072 | A | * | 3/1997 | Hammond et al. | 705/4 |
| 5,655,085 | A | * | 8/1997 | Ryan et al. | 705/4 |
| 5,689,650 | A | * | 11/1997 | McClelland et al. | 705/36 |
| 5,732,401 | A | * | 3/1998 | Conway | 705/29 |

FOREIGN PATENT DOCUMENTS

JP 07239885 A * 9/1995

OTHER PUBLICATIONS

Brooks; "Insuring Leasing Transactions", Jun. 1992, American Agent & Broker v64n6 PP: 12; Dialog file 15, Accession No. 00644197.*

Schallheim ; "A model for the determination of "Fair" Premiums on Lease Cancellation Insurance Policies", Dec. 1985, Journal of Finance, v40n5, PP. 1439–1457, Dialog file 15, Accession No. 00302216.*

Gelb et al; "The advent of comprehensive state automobile leasing legislation";, May 1995, Business Lawyer, 50, n3, Dialog file 148, Accession No. 08267835.*

Amihud; "Leasing has its lures–but you must do your homework", Sep. 1994, South Florida Business Journal, Dialog file 148, Accession No. 07551018.*

Candler; "Leasing passes the road test", May 1997, Nation's Business V85n5 pp. 54–58, Dialog file 15, Accession No. 01408564.*

Gale Group " Automotive financing: for business and pleasure"; Dialog file 148 Accession No. 08456990), Feb. 1996.*

(List continued on next page.)

Primary Examiner—Tariq R. Hafiz
Assistant Examiner—Romain Jeanty
(74) Attorney, Agent, or Firm—Raymond A. Joao

(57) ABSTRACT

An apparatus and method for processing lease insurance information which includes a memory device for storing a first data set, wherein the first data set contains information for generating at least one of an insurance premium and an insurance policy for providing lease insurance for excess wear and tear for a leased entity or post-warranty repairs for a leased entity, respectively, a processor for processing the first data set in conjunction with a second data set and a third data set, wherein the second data set contains information regarding at least one of the entity to be leased and a term of the lease, and wherein the third data set contains information regarding at least one of the leasing individual, the leasing entity, or other pertinent information, and further wherein the processor generates a fourth data set containing at least one of an insurance premium and an insurance policy for providing insurance for excess wear and tear or post-warranty repairs, respectively, for the leased entity, and a device for at least one of displaying and outputting information contained in at least one of said fourth data set, the insurance premium, and the insurance policy.

31 Claims, 8 Drawing Sheets

OTHER PUBLICATIONS

Leasing USAF Aircraft and Related Equipment to Nongovernment Organizations; Department of Defense; Dilogue, file# 180, Account# 02130282, Jan. 1989.*

Daniel Grant; The art of Leasing; The Washington Post; Dialogue, File#146, Account# 1932827, Aug. 1990.*

Gregory; Tax Practice vs. Lease of an automobile; Journal of Accountancy; pages (4); Dialogue, file#15, account# 00602783, Mar. 1992.*

How to avoid common pitfalls in equipment lease; Journal article; Dialogue, file# 15, Account# 00886995, Feb. 1994.*

Jerome; Auto Insurance: The three Cs; Journal of Accountancy; Dialogue, file#15, Account# 00829979, Mar. 1994.*

Leichtling; How to lease in peace; Journal article; Dialogue, file# 15, Account#00879173; Pages(4), Aug. 1994.*

White; Is leasing for you; Dialogue, file 47, Account# 04320480; Pages(2), Aug. 1995.*

Gardner; "Cadillac Includes Extended Warranty in Used Car Lease"; Detroit Free Press(FP); Dialog, File: 498, Accession No. 07519386, Jun. 1994.*

Tucker, "Video Aid a Marketing Tool As Well as Extended Service Seller"; The Weekly Home Furnishings Newspaper, v0, n0, p. 124; Dialog, File: 16, Accession No. 01662438, May 1991.*

Daniel; "At your service. (Strategies) (extended service warranties) (includes related article on extended service options) (tutorial)", PC Sources, v2, n10, p248(8); Dialog, File: 275, Accession No. 01452994, Oct. 1991.*

Rhoden; "GE Capital Won't Back All Repairs", Edition: 1 STAR section: Business page: B7; Dialog, File: 708, Accession No. 06860164, Dec. 1992.*

Freudgerg; "Ask Questions Before Extending Warranty"; Edition: Final Section: Money page:04B; Dialog, File: 703, Accession No. 07357024, Dec. 1993.*

"Ford Plans to Build Repair Shops Centers Designed to Handle Small Jobs, Post–Warranty Work"; Edition; 2 Star Section BUSINESS page: B8; Dialog, File: 708, Accession No. 08011087, Jan. 1995.*

Walker; "Service Contracts Can Save You Money . . . If The Price Is Right"; Edition Third Section: Business page: D01; Dialog, File: 738, Accession No. 06237029, Aug. 1991.*

"How to reduce auto repair problems", Consumer's Research Magazine (GCRM), v79 n1, p26–30; Dialog, File: 484, Accession No. 02702085, Jan. 1995.*

Robert, Jr.; "Making sense out of warranties. (recreational vehicle warranties)"; Trailer Life, v56, n3, p38(9); Dialog, File: 47, Accession No. 04467219, Mar. 1996.*

Freudberg; "Extra Warranties Boost Profit Scant Aid to Buyers"; USA Today, page: 04B; Dialog, File: 703, Accession No. 07357025, Dec. 1993.*

Homeowners Group And AIG's New Hampshire Insurance Company, Will Offer A National Fully Insured Home Warranty Product; Dialogue: File 16, account No. 06072597, Feb. 1996.*

Sawyers; Product Aims at Tough Lease Customers; Automotive News; Dialogue; File 16, Account No. 07829342, Oct. 1998.*

* cited by examiner

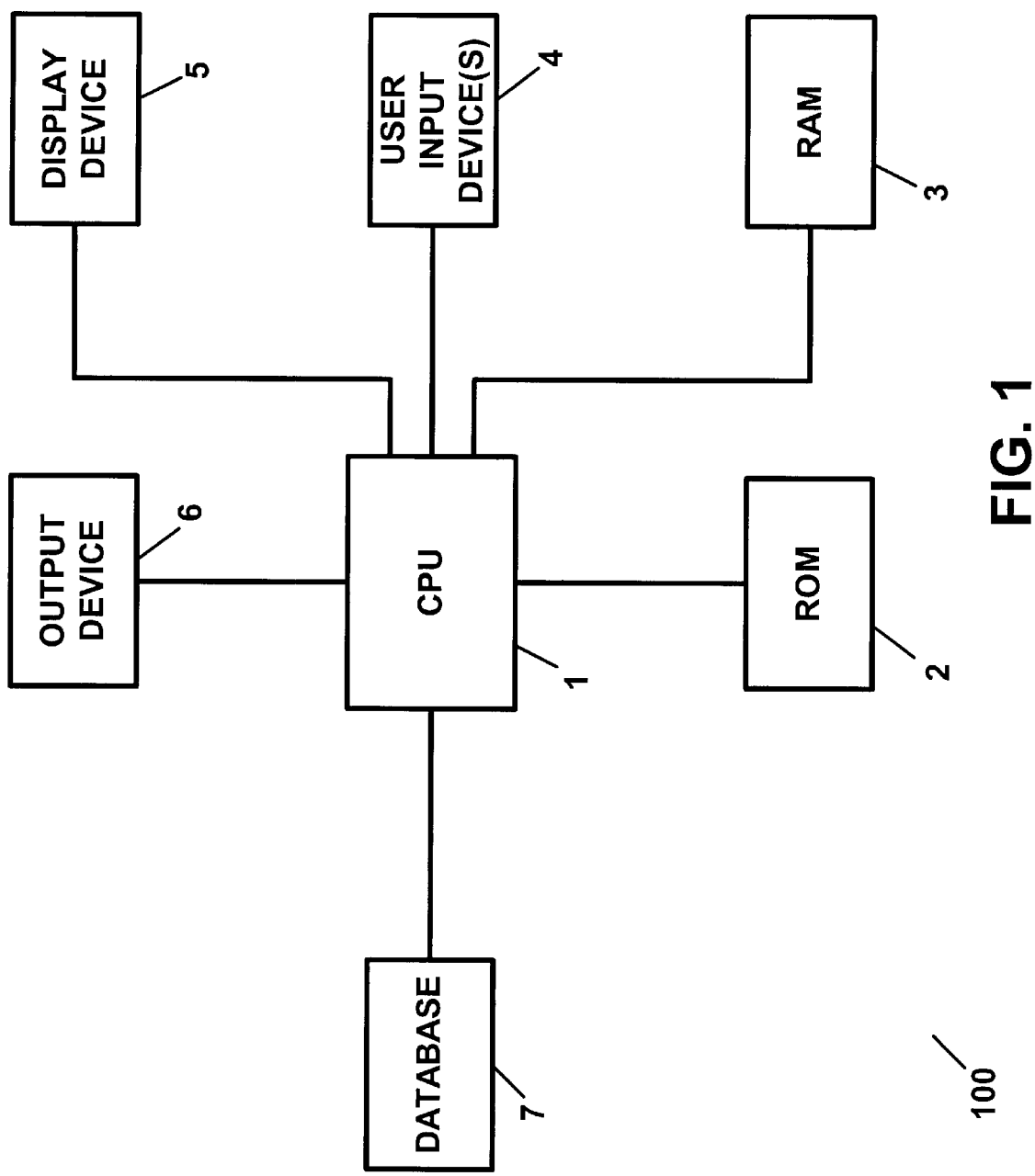

APPARATUS AND METHOD FOR PROCESSING LEASE INSURANCE INFORMATION

FIELD OF THE INVENTION

The present invention pertains to an apparatus and method for providing insurance products, services and/or coverage for leased entities and, in particular, to an apparatus and method for providing insurance products for leased and/or rented vehicles, personal as well as business articles and entities and residential and commercial premises and properties.

BACKGROUND OF THE INVENTION

In recent times, a growing number of individuals and business concerns have turned to leasing and/or renting articles such as automobiles, boats, airplanes, office equipment, computers and computer equipment and various other articles. Residential as well as commercial property leases and rentals have also been popular and, in many situations, necessary.

Leasing and renting, however, place responsibility for the care and well-being of the leased and/or rented entity upon the respective lessee or renter. The leased or rented entity or premises must be maintained and delivered back to the lessor or landlord in relatively good condition. In this regard, wear and tear which is in excess of normal wear and tear is typically not acceptable to the lessor or landlord without the lessee or renter being held responsible for this excess wear and tear and/or damage. The lessee or renter is also usually held responsible for post-warranty repairs which are required and which result from normal wear and tear, the malfunction and/or failure of any components and/or systems of the leased and/or rented entity and/or from any defects in material and/or workmanship in any component and/or system of the leased and/or rented entity. In this regard, the lessee or renter will typically be held financially responsible for this excess wear and tear and/or damage, including post-warranty repairs, to the leased and/or rented entity.

Oftentimes, excess wear and tear of a leased or rented article or premises may be beyond the lessee's or renter's control, yet the lessee or renter may still be held financially liable for the resulting repairs and/or repair bills in excess of any previously paid security deposit. This can lead to a financial hardship and an unexpected financial burden to many. In the case of leased motor vehicles, the excess wear and tear charges may be substantial. The same may hold true for leased boats, recreational vehicles, airplanes as well as leased office equipment, computers and computer equipment. Lastly, those who lease or rent residential and/or commercial premises may also find themselves with substantial liability upon termination of their lease and/or rental relationship with the landlord or property owner.

While many insurance products and services exist to limit one's liability and/or to provide monetary protection upon the occurrence of certain events, no corresponding insurance products services and/or coverage exist which provides insurance coverage for individuals and/or business entities which would serve to protect these individuals and/or business entities from liability which may arise as the result of excess wear and tear and/or damage which may have occurred to the leased entity during the lease and/or rental term.

In a similar manner, no insurance products, services and/or coverage exists for protecting individuals and/or business entities from liability which results from post-warranty repairs, aside from the purchase of extended warranty protection, which typically covers the entity well past the lease term and which is usually very costly and impractical for a lesser or renter to purchase.

SUMMARY OF THE INVENTION

The present invention provides an apparatus and a method for overcoming the shortfalls of the prior art and provides an apparatus and a method for providing insurance products, services and/or coverage which provides insurance coverage for protecting individuals and/or business entities from liability which may arise as the result of excess wear and tear and/or damage which may occur to a leased and/or rented entity during the lease and/or rental term, and further, for protecting individuals and/or business entities from liability for post-warranty repairs.

The apparatus comprises a central processing unit, a read only memory device, a random access memory device, a user input device(s), a display device, an output device and a database. The database contains data and/or information which is relevant to determining insurance policies and premiums related to the leasing and/or rental of vehicles, motor vehicles, boats, recreational vehicles, airplanes, aircraft, motorcycles, office equipment, computers, computer equipment and other articles, personal and/or commercial, which may be the subject of a lease or rental arrangement. The database also includes data and/or information which is relevant in determining insurance policies and premiums for residential and/or commercial properties and/or premises.

Data and/or information, which is related to vehicle leases, includes vehicle year, model, vehicle components and/or systems along with their repair costs, replacement costs, probability of damage, probability of post-warranty repairs necessitated by wear and tear, damage, malfunctioning components and/or systems and defects in materials, parts, components, systems and/or workmanship, average costs for repairs, historical leasing data including costs of typical repairs, average total excess wear and tear costs for the entire vehicle. Vehicle leasing data and/or information also includes locality, regional and geographical data which is correlated with excess wear and tear along with data and/or information which is related to driving habits and/or patterns in a given area or areas. Data and information related to individuals and/or business entities, by region, occupation etc, including driving habits, leasing histories, etc., will also be included in the database.

The database will also include data and/or information for particular individuals and/or business entities which includes personal, individual and/or organizational driving and/or usage patterns and/or driving histories and leasing histories as well as any other information which an insurer may deem necessary and/or desirable in determining whether insurance should be offered to an individual and/or business entity.

Data and/or information related to the leasing and/or rental of any other leasable article and/or entity, such as, for example, personal, residential and/or commercial office equipment, computers, computer equipment, facsimile machines, copy machines, furniture as well as any other article, piece of equipment and/or entity (hereinafter referred to as "leasable article" or "article") are also included in the database. Leasable article data and/or information includes article year, model, article components and/or systems along with their repair costs, replacement costs, probability of damage, probability of post-warranty repairs necessitated by wear and tear, damage, malfunctioning components and/or systems and defects in materials, parts, components, systems and/or workmanship, average costs for repairs, historical leasing data including typical repair costs and average total excess wear and tear costs for the entire article. Article leasing data and/or information also includes locality, regional and geographical data which is correlated with excess wear and tear along with data and/or information which is related to use habits and/or patterns in a given area or areas. Data and information related to individuals and/or business entities, by region, occupation, etc., including use habits, leasing histories, etc., will also be included in the database.

The database will also include data and/or information for particular individuals and/or business entities which includes personal, individual and/or organizational use habits and/or patterns and/or use histories and leasing histories as well as any other information which an insurer may deem necessary and/or desirable in determining whether insurance should be offered to an individual and/or business entity.

Data and/or information related to the lease or rental of residential and/or commercial premises which are included in the database, includes type and age of premises, parts and/or components and/or systems of the premises along with their repair costs, replacement costs, probability of damage, probability of post-warranty repairs necessitated by wear and tear, damage, malfunctioning components and/or systems and defects in materials, parts, components, systems and/or workmanship, average costs for repairs, historical leasing and/or renting data, including typical repair costs and average total excess wear and tear costs for the entire premises. Premises leasing data and/or information also includes locality, regional and geographical data which is correlated with excess wear and tear along with data and/or information which is related to use habits and/or patterns in a given area or areas. Data and information related to individuals and/or business entities, by region, nature of use, including use habits, leasing and/or rental histories, etc., will also be included in the database.

The database also includes data and/or information for particular individuals and/or business entities which includes personal, individual and/or organizational use habits and/or patterns and/or use histories and leasing and/or rental histories as well as any other information which an insurer may deem necessary and/or desirable in determining whether insurance should be offered to an individual and/or business entity.

The database also includes all necessary actuarial, statistical and related data and/or information necessary in performing the calculations and analysis deemed necessary in underwriting and issuing an insurance policy and/or coverage, including premium determination for any of the herein described insurance policies, products, services and/or coverage.

As noted above, the present invention provides an apparatus and a method for providing insurance policies, products, services and/or coverage for protection against liability which may arise as the result of excess wear and tear to a leased and/or rented entity and/or for liability which may arise for post-warranty repairs. In this regard, individuals and/or business entities may obtain insurance so as to protect themselves from liabilities which might arise from the lease and/or rental of an entity which may have experienced excess wear and tear and/or damage during the lease or rental term. Further insurance for post-warranty repairs may also be obtained.

The present invention can also provide insurance policies, products, services and/or coverage for any of the herein-described entities while providing an incentive and/or incentive or incentives, to individuals and/or business entities, for minimizing excess wear and tear and/or damage to the leased and/or rented entity by providing for a commensurate rebate of a portion of the policy premiums or charges, at the end of the lease and/or rental term. In this regard, an individual and/or business entity may choose to elect an insurance policy with an incentive program so that a portion of the policy premium or charges will be refunded to him, her, or it, respectively, when and if the entity is returned with no and/or minimal excess wear and tear and/or with no and/or minimal damage. Such an incentive program would serve to reward individuals and/or business entities who and/or which, respectively, maintain the entity, during the lease and/or rental term, so that the entity is returned with no and/or minimal wear and tear or with no and/or minimal damage.

In an alternate embodiment, the apparatus of the present invention is utilized in a network environment so as to provide insurance policies, products, services and/or coverage in, and over, a network such as on, or over, the Internet, the World Wide Web and/or any other communications network and/or system.

Accordingly, it is an object of the present invention to provide an apparatus and method for providing insurance policies, products, services and/or coverage for leased and/or rented entities and/or premises for providing insurance protection against liability which may arise as the result of excess wear and tear and/or damage which may occur to a leased and/or rented entity during the lease and/or rental term.

It is another object of the present invention to provide an apparatus and method for providing insurance policies, products, services and/or coverage for leased and/or rented entities and/or premises for providing insurance protection against liability which may arise as the result of post-warranty repairs.

It is another object of the present invention to provide an apparatus and a method for providing insurance policies, products, services and/or coverage for leased and/or rented entities and/or premises which is implemented using software in conjunction with a computer and/or a processing system.

It is another object of the present invention to provide an apparatus and a method for providing insurance policies, products, services and/or coverage for leased motor vehicles.

It is another object of the present invention to provide an apparatus and a method for providing insurance policies, products, services and/or coverage for leased boats and marine vehicles.

It is another object of the present invention to provide an apparatus and a method for providing insurance policies, products, services and/or coverage for leased airplanes and aircraft.

It is another object of the present invention to provide an apparatus and a method for providing insurance policies, products, services and/or coverage for leased articles and/or equipment of any variety or type.

It is another object of the present invention to provide an apparatus and a method for providing insurance policies, products, services and/or coverage for leased and/or rented residential premises and/or commercial premises.

It is yet another object of the present invention to provide an apparatus and a method for providing insurance policies, products, services and/or coverage for leased and/or rented entities which provides incentives for maintaining the leased and/or rented entity with no and/or minimum excess wear and tear and/or with no and/or minimal damage during the lease and/or rental term.

It is yet another object of the present invention to provide an apparatus and a method for providing insurance policies, products, services and/or coverage for leased and/or rented entities, vehicle, premises, equipment and other appropriate articles on, or over, a communication network such as on, or over, the Internet, the World Wide Web and/or any other communications and/or network environment and/or medium.

Other objects and advantages of the present invention will be apparent to those individuals skilled in the art upon a review of the Description Of The Preferred Embodiment taken in conjunction with the Drawings which follow.

BRIEF DESCRIPTION OF THE DRAWINGS

In the Drawings:

FIG. 1 illustrates a block diagram of the apparatus which is the subject of the present invention;

DESCRIPTION OF THE PREFERRED EMBODIMENT

Figure 2A:
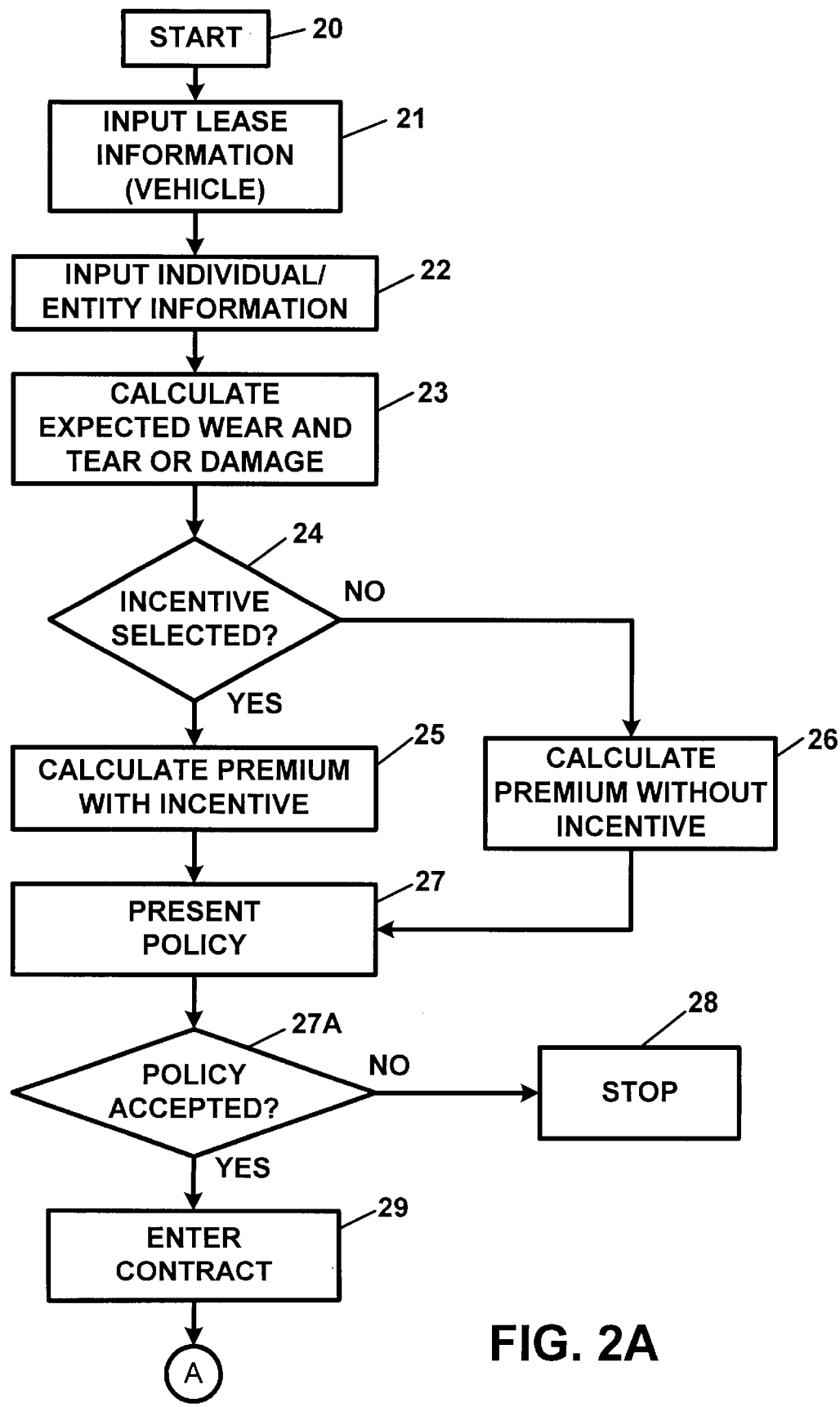
FIGS. 2A and 2B illustrate a flow chart of a preferred embodiment method of operation of the apparatus of FIG. 1.

FIG. 1 illustrates a block diagram of the apparatus which is the subject of the present invention and which is denoted generally by the reference numeral 100. The apparatus 100 comprises a central processing unit (CPU) 1 which, in the preferred embodiment, is a microprocessor. The CPU 1 may also be a microcomputer, a minicomputer, a macrocomputer, and/or a mainframe computer, depending upon the application. The CPU 1 may also be implemented as a server computer in a network configuration.

The apparatus 100 also comprises a read only memory (ROM) 2 and a random access memory (RAM) 3 which are also connected to the CPU 1. The apparatus 100 also comprises a user input device(s) 4 which comprise(s) any one or more of a keyboard, a scanner, a user pointing device, such as, for example, a mouse, a touch pad, and/or an audio input device and/or a video input device, etc., if desired, which input device(s) are also be connected to the CPU 1. The apparatus 100 also comprises a display device 5, such as a display monitor, which is also connected to the CPU 1, and an output device 6, such as a printer, a fax/modem, etc., which output device is also connected to the CPU 1.

The apparatus 100 also comprises a database(s) 7, wherein various information and/or data, which is utilized in the various processing routines, as will be described herein, is stored and which is also connected to, and accessible by, the CPU 1. Various data and/or information related to the leasing and/or rental of vehicles, motor vehicles, trucks, construction equipment, farm equipment, boats, recreational vehicles, airplanes, aircraft, motorcycles, office equipment, computers, computer equipment, and other articles and/or devices, equipment, etc., including articles and/or equipment which may be utilized in, and/or in conjunction with residential and/or commercial premises, is stored in the database 7. The database 7 also includes data and/or information related to the leases of residential and/or commercial property and/or premises.

Data and/or information related to vehicle leases, which is included in the database 7, includes vehicle year, model, vehicle components and/or systems along with their repair costs, replacement costs, probability of damage, probability of post-warranty repairs necessitated by wear and tear, damage, malfunctioning components and/or systems and defects in materials, parts, components, systems and/or workmanship, average costs for repairs, historical leasing data, average total excess wear and tear and/or damage costs for the entire vehicle. Vehicle leasing data and/or information also includes locality, regional and geographical data which is correlated with excess wear and tear and/or damage costs along with data and/or information which is related to driving and/or usage habits and/or patterns in a given area or areas. Data and information related to individuals and/or business entities, by region, occupation etc, including driving and/or usage habits, leasing histories, etc., will also be included in the database 7.

Excess wear and tear and damage, as the terms are used herein, refer to, and includes, any and all conditions and/or states of the leased and/or rented entity, including but not limited to scratches, dents, tears, stains, etc, malfunctioning and/or inoperable components and/or systems, state(s) of disrepair, and any and all other states and/or conditions which will subject the lessor and/or renter to any liability therefor at the end of the lease and/or rental term.

Post-warranty repairs, as the term is used herein, includes any and all repairs which are made necessary from any wear and tear, normal or otherwise, to components and/or systems of the herein-described entities and further includes repairs which result from defects in materials and/or workmanship. Post-warranty repairs also include any and all repairs which would be covered under a manufacturer's warranty. In this regard, the apparatus and method of the present invention provides for extended warranty protection for the leased and/or rented entity for the duration of the lease or rental term. The database 7 also includes any and all data and/or information which will facilitate the calculation, determination and/or formulation of an insurance policy, product, service and/or coverage for providing extended warranty protection for any leased and/or rented entity described herein.

The database 7 also includes data and/or information for particular individuals and/or business entities which includes personal, individual and/or organizational driving and/or usage patterns and/or driving and/or usage histories and leasing histories as well as any other information which an insurer may deem necessary and/or desirable in determining whether insurance should be offered and/or underwritten for an individual and/or business entity.

Data and/or information related to the leasing and/or rental of any other leasable article and/or entity, such as, for example, personal, residential and/or commercial office equipment, computers, computer equipment, facsimile machines, copy machines, furniture, as well as any other article, piece of equipment and/or entity (hereinafter referred to as "leasable article"), which may be the subject of a lease or rental arrangement, is also included in the database 7.

Leasable article data and/or information includes article age or model year, model, article components and/or systems along with their repair costs, replacement costs, probability of damage, probability of post-warranty repairs necessitated by wear and tear, damage, malfunctioning components and/or systems and defects in materials, parts, components, systems and/or workmanship, average costs for repairs, historical leasing data and average total excess wear and tear and/or damage costs for the entire article. Article leasing data and/or information also includes locality, regional and geographical data which is correlated with excess wear and tear and/or damage costs along with data and/or information which is related to usage habits and/or patterns in a given area or areas. Data and information related to individuals and/or business entities, by region, occupation etc, including usage habits, leasing histories, etc., will also be included in the database 7.

The database 7 also includes data and/or information for particular individuals and/or business entities which includes personal, individual and/or organizational use and/or usage habits and/or patterns and/or use or usage histories and leasing histories as well as any other information which an insurer may deem necessary and/or desirable in determining whether insurance should be offered to an individual and/or business entity.

Data and/or information related to the leasing and/or rental of residential and/or commercial premises, which is included in the database 7, includes type and age of the premises, portions and/or components and/or systems of the premises, along with their repair costs, replacement costs, probability of damage, probability of damage, probability of post-warranty repairs necessitated by wear and tear, damage, malfunctioning components and/or systems and defects in materials, parts, components, systems and/or workmanship, average costs for repairs, historical leasing and/or renting information, average total excess wear and tear costs for the entire premises. Premises leasing data and/or information also includes locality, regional and geographical data which is correlated with excess wear and tear and/or damage, along with data and/or information which is related to use or usage habits and/or patterns for a given type of premises and/or for a given area or areas. Data and information related to individuals and/or business entities, by region, nature of use or usage, including use or usage habits, leasing and/or rental histories, etc., is also included in the database 7.

The database 7 will also include data and/or information for particular individuals and/or business entities which includes personal, individual and/or organizational use and/or usage habits and/or patterns and/or use or usage histories and leasing and/or rental histories as well as any other information which an insurer may deem necessary and/or desirable in determining whether insurance should be offered to an individual and/or business entity.

The data and/or information which is stored in the database(s) 7, in the preferred embodiment, also includes data and/or information related to various damage and/or repairs which may need to be performed on any of the above entities, the frequency with which these repairs had to be made in previous lease and/or rental situations involving the same, identical and/or similar types of individuals and/or business entities, and the costs for repairing damage and/or needed repairs, which may include high, low and average repair costs. For example, if a motor vehicle is leased, average, high and low repair costs which have resulted from previous leases of the same or a similar vehicle, would be stored in the database 7, as would analogous information concerning any of the above identified leased and/or rented entities and/or articles.

The database 7 also comprises any and all necessary actuarial, statistical, insurance, risk, risk of loss and application specific data and/or information which is related to, and which is necessary and/or helpful in calculating, determining, formulating and/or underwriting insurance policies, products, services and/or coverage. In particular, the database 7 will contain any necessary and/or helpful data and/or information for providing insurance policies, products, services and/or coverage for insuring against liability for excess wear and tear and/or damage to a leased and/or a rented entity which may occur during the lease and/or rental term, along with liability for post-warranty repairs.

The database 7 also comprises data and/or information related to insurance premiums which data and/or information is utilized to calculate and/or underwrite an insurance policy, depending upon the nature and the amount of coverage for the leased and/or rented entity of interest. The database 7 also contains statistical information related to sex, age, driving and use record histories for individuals and/or business entities which information can be utilized in insurance policy and/or premium determinations and calculations. The database 7 also comprises data and/or information concerning past lease experiences, if any, for individuals and business entities, including specific individuals and/or business entities, along with corresponding records concerning any end of lease damage and/or excess wear and tear which may have occurred in past leasing and/or rental relationships.

The database 7 also contains data and/or information related to lease and or rental term, data and/or information related to geography, season, etc., along with data and/or information related to how these variables affect any other data and/or information described herein.

The data and/or information which is stored in the database 7, in addition to the above data and/or information, contains any other necessary, recommended and/or supplemental data and/or information, and/or application program (s) which may be helpful and/or desired by an insurer in determining whether to issue an insurance policy, product, service and/or coverage described herein.

The data and/or information which is stored in the database 7 may be utilized to calculate risk, risk of loss and/or damage probabilities for an individual and/or business entity, for any given lease or rental situation, lease or rental entity and/or lease and/or rental agreement.

The data and/or information which is stored in the database 7 may be utilized to calculate risk, risk of loss and/or damage probabilities for any of the leased and/or rented vehicles, articles and/or premises described herein, for any individual and/or business entity and for any given lease and/or rental situation. The present invention may be utilized to custom design and/or calculate an insurance policy, product, service and/or coverage for a particular lease or rental agreement and/or situation by utilizing risk, risk of loss, risk assessment and underwriting techniques which can be modified for the particular application.

The data and/or information described herein will be utilized to generate and underwrite an insurance policy as well as to calculate an insurance premium or charges, depending upon the nature and the amount of the coverage desired for the leased and/or rented entity. The data and/or information which is stored in the database 7 will be updated regularly so as to maintain the most accurate and current data as possible.

The present invention provides an apparatus and a method for providing insurance policies, products, services and/or any of the herein-described coverages for any of the herein-described leased and/or rented entities. In this regard, individuals and/or business entities may obtain insurance so as to protect themselves from liabilities which might arise from a leased and/or rented entity being returned with damage and/or excess wear and tear at the end of the lease and/or rental term, as well as providing protection against liabilities for post-warranty repairs.

Figure 2B:
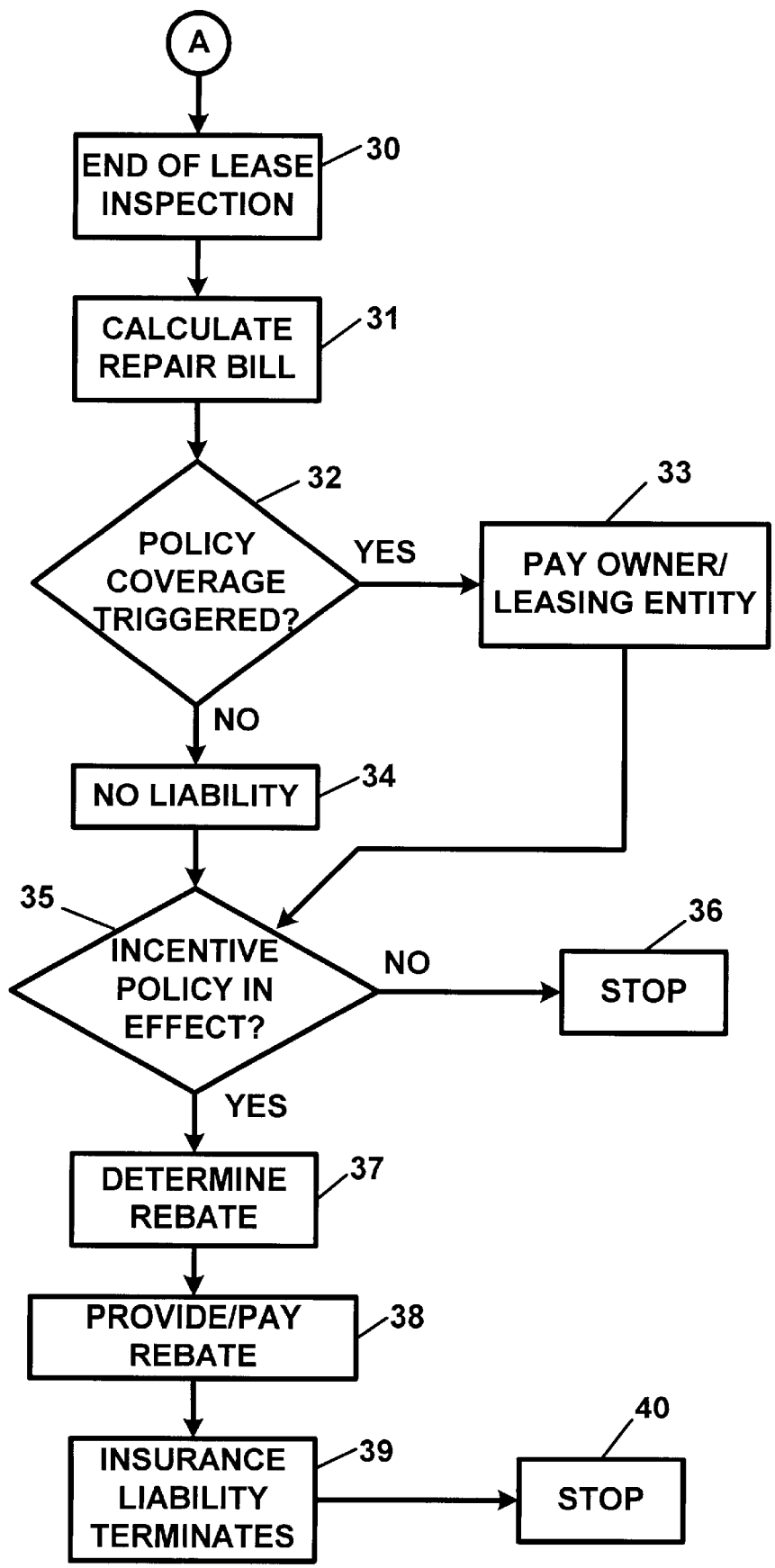

FIGS. 2A and 2B illustrate a flow chart of a preferred embodiment method of operation of the apparatus and method of the present invention which is utilized in conjunction with leased vehicles, which vehicles include motor vehicles, including passenger and commercial automobiles and trucks, boats, marine vehicles, airplanes, aircraft, motorcycles, recreational vehicles and/or motor and/or mobile homes.

In FIGS. 2A and 2B, the method and/or operation of the apparatus commences at step 20. At step 21, data and/or information pertaining to the vehicle to be leased, including type, year, make and model, along with the lease term and any other pertinent information related to the lease (i.e. mileage allowance, down payment, security payment, lease end purchase option and price, etc.) will be selected and input into the apparatus 100. Information pertaining to insurance coverage for post-warranty repairs, if desired, is also selected and input at step 21.

At step 22, data and/or information related to the individual or business entity who or which, respectively, will be leasing the vehicle (i.e. individual, business entity, including driving and/or usage history, insurance history, past leasing history, desired insurance coverage, insurance deductible, insurance policy terms, etc.) will be entered into the apparatus 100. At step 22, the individual and/or business entity may or may not also select an insurance policy which provides for an incentive for maintaining the vehicle with no and/or minimum wear and tear and/or with no and/or minimum damage during the lease term. In this regard, the individual and/or business entity may select to participate in an incentive policy agreement whereby the individual and/or business entity may receive a rebate and/or a return of a portion of the insurance policy's premiums and/or charges at the end of the lease term if the vehicle is returned with no and/or minimal excess wear and tear and/or with no and/or minimal damage.

At step 23, the apparatus 100 will calculate expected excess wear and tear and/or damage, and/or information related to post-warranty repair, which is expected to occur during the lease term, given the data input at steps 21 and 22 along with the pertinent data and/or information which is stored in the database 7. The data and/or information which is stored in the database 7 and which is utilized in calculating an insurance premium and formulating the associated insurance policy may also include any one or more of data and/or information related to various damage and/or repairs which may need to be performed on, or for, the vehicle in question, the frequency with which these repairs had to be made in previous leases and/or rentals dealing with the same, identical and/or similar and/or analogous vehicles, the costs for repairing excessive wear and tear and/or damage, post-warranty repair data, data and/or information related to insurance premiums which data and/or information is utilized to calculate an associated insurance premium, the nature of the desired coverage, coverage deductibles, statistical information related to any of the above data and/or information as well as statistical information related to sex, age and driving and usage record histories for the individual and/or business entity as well as for individuals and/or business entities in the same, similar or analogous classes.

Database data and/or information also includes past lease experiences, if any, for the individual and/or business entity as well as for individuals and/or business entities in the same, similar, or analogous classes, records concerning any end of lease damage which may have occurred in an individual's and/or business entity's past leasing relationships, or for those individuals and/or business entities in the same, similar or analogous classes and data and/or information related to lease and/or rental term.

At step 24, the apparatus 100 will determine whether the individual and/or business entity has chosen to participate in an insurance policy which provides for the above-described incentives. At step 24, if an incentive policy has been chosen, the apparatus 100, at step 25, will calculate or formulate an insurance policy and corresponding premium or charge which provides for the above-described incentive feature. If, at step 24, it is determined that an incentive policy has not been chosen, the apparatus 100, at step 26, will calculate or formulate an insurance policy and corresponding premium without the incentive feature.

At step 27, the policy can then be presented to the individual and/or business entity for acceptance. The individual may then, at step 27, chose to accept or reject the insurance policy. If, at step 27A, it is determined that the individual and/or business entity did not accept the policy, the processing will cease at step 28. If, at step 27A, it is determined that the individual and/or business entity accepted the policy, the parties will enter into the relevant insurance contract at step 29, typically with the payment of the policy premium or partial premium and the issuance of the insurance policy. The policy will thereafter be issued. The policy will thereafter be in effect so as to protect the individual and/or business entity from liability for excess wear and tear and/or damage which may occur to the vehicle during the lease term. Upon the termination of the lease term, at step 30, the vehicle will be inspected for excess wear and tear and/or damage.

At step 31, the value or repair amount and/or liability for any excess wear and tear and/or damage, which may be found, will be calculated. If post-warranty coverage is in effect, the value for any post-warranty repairs will also be determined at step 31. At step 32, the apparatus 100 will then determine if the value of any excess wear and tear and/or damage is of such a magnitude to trigger policy coverage. The apparatus 100 will also, at step 32, determine if post-warranty coverage is triggered.

If, at step 32, policy coverage is triggered, the insurance provider or policy underwriter will, at step 33, assume responsibility for, and effect payment to the vehicle owner and/or leasing entity for, the excess wear and tear and/or damage. The insurance provider or policy underwriter will also, at step 33, assume responsibility for, and effect payment for any post-warranty repairs, if such coverage is in effect. If, however, coverage is not triggered at step 32, the insurance provider or underwriter will, at step 34, have no liability to the vehicle owner or leasing entity.

At step 35, it will be determined if an incentive policy is in effect. If no incentive policy is in effect, the operation of the apparatus and/or process will cease at step 36. If, at step 35, it is determined that an incentive policy is in effect, the apparatus 100, at step 37, will determine the amount of the rebate and/or premium which is to be returned to the individual and/or business entity. At step 38, the individual and/or business entity will receive the rebate.

If no excess wear and tear and/or no damage has been found to exist, the individual and/or business entity will receive the full rebate amount at step 38. If excess wear and tear and/or damage has been found to exist at, or above, a pre-defined amount, the individual and/or business entity will receive no rebate at step 38. If excess wear and tear and/or damage has been found to exist below a pre-defined limit, a rebate amount will be calculated according to a pre-defined calculation and/or interpolation routine and the individual and/or business entity will receive the calculated amount at step 38.

In the preferred embodiment, a linear interpolation routine is utilized to calculate the partial rebate amount at step 38. It is important to note that any mathematical computation routine and/or interpolation routine, linear or non-linear, as well as any other method for calculating an amount, or a partial amount, may be utilized in the processing scheme of the present invention. As noted above, rebate calculations will be performed at step 37.

Once the individual and/or business entity has been issued their or its rebate, the liability of the insurance provider and/or underwriter will cease at step 39. The operation and method of the present invention will then cease at step 40.

Figure 3A:
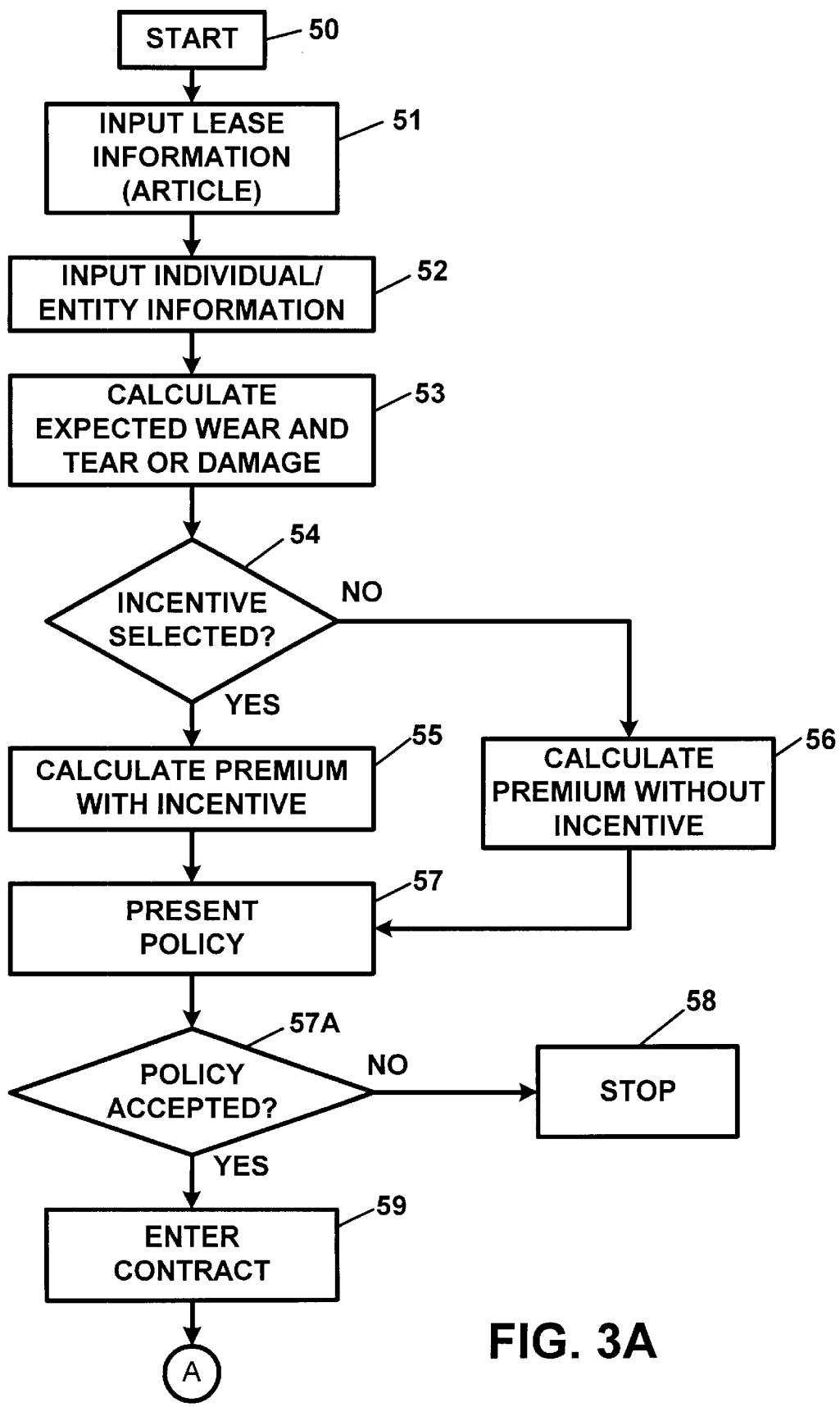
FIGS. 3A and 3B illustrate a flow chart of an alternate embodiment method of operation of the apparatus of FIG. 1.
Figure 3B:
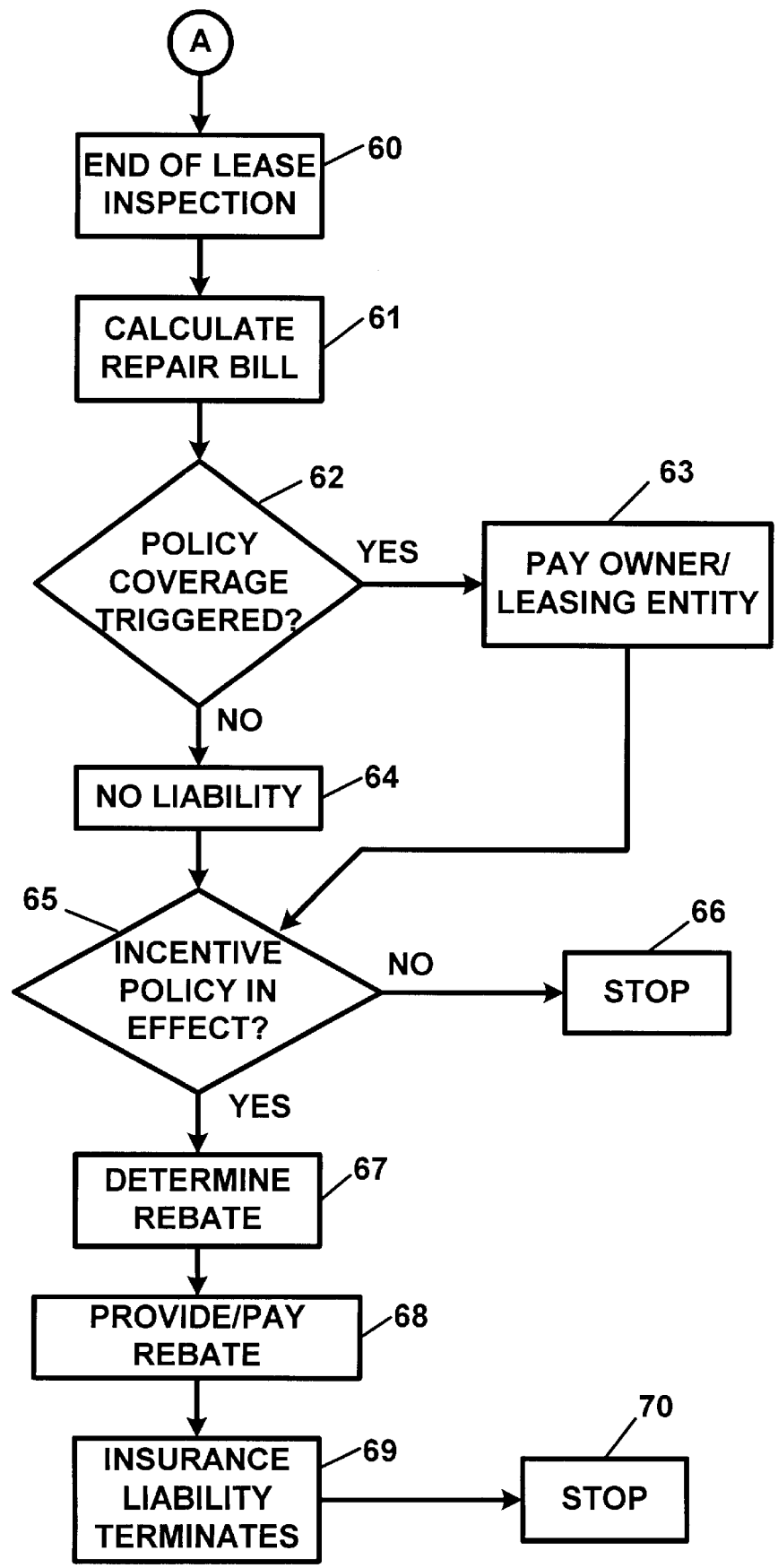

FIGS. 3A and 3B illustrate a flow chart of an alternate embodiment method of operation of the apparatus and method of the present invention which is utilized in conjunction with a leased article, which may include an article of office equipment, business equipment, exercise equipment, computers, computer equipment and/or peripherals and any other item, device or article which may be deemed to be desirable as the subject of a lease and/or a rental arrangement and/or agreement (hereinafter referred to as "article").

In FIGS. 3A and 3B, the operation of the apparatus and method commences at step 50. At step 51, data and/or information pertaining to the article to be leased, including type, year, make and model, along with the lease term and any other pertinent information related to the lease (i.e. use allowance, down payment, security payment, lease end purchase option and price, etc.) will be selected and input into the apparatus 100. Information pertaining to insurance coverage for post-warranty repairs, if desired, is also selected and input at step 51.

At step 52, data and/or information related to the individual and/or business entity who, or which, respectively, will be leasing the article (i.e. individual and/or business entity use or usage history, insurance history, past leasing history, desired insurance coverage, insurance deductible, insurance policy terms, etc.) will be entered into the apparatus 100. At step 52, the individual and/or business entity may or may not also select an insurance policy which provides for an incentive for maintaining the article with no and/or minimum wear and tear and/or with no and/or minimum damage during the lease term. In this regard, the individual and/or business entity may select to participate in an incentive policy agreement whereby the individual and/or business entity may receive a rebate and/or a return of a portion of the insurance policy's premiums and/or charges at the end of the lease term if the article is returned with no and/or minimal excess wear and tear and/or with no and/or minimal damage.

At step 53, the apparatus 100 will calculate expected excess wear and tear and/or damage, and/or information related to post-warranty repair, which is expected to occur during the lease term, given the data input at steps 51 and 52 along with the pertinent data and/or information which is stored in the database 7. The data and/or information which is stored in the database 7 and which is utilized in calculating an insurance premium and formulating the associated insurance policy may also include any one or more of data and/or information related to various damage and/or repairs which may need to be performed on the article in question, the frequency with which these repairs had to be made in previous leases and/or rentals dealing with the same, identical and/or similar and/or analogous articles, the costs for repairing excessive wear and tear and/or damage, post-warranty repair data, data and/or information related to insurance premiums which data and/or information is utilized to calculate an associated insurance premium, the nature of the desired coverage, coverage deductibles, statistical information related to any of the above data and/or information as well as statistical information related to sex, age and use and/or usage histories for the individual and/or business entity as well as for individuals and/or business entities in the same, similar or analogous classes.

Database data and/or information also includes past lease experiences, if any, for the individual and/or business entity as well as for individuals and/or business entities in the same, similar, or analogous classes, records concerning any end of lease damage which may have occurred in an individual's and/or business entity's past leasing relationships, or for those individuals and/or business entities in the same, similar or analogous classes and data and/or information related to lease and/or rental term.

At step 54, the apparatus 100 will determine whether the individual and/or business entity has chosen to participate in an insurance policy which provides for the above-described incentives. At step 54, if an incentive policy has been chosen, the apparatus 100 will, at step 55, calculate or formulate an insurance policy and corresponding premium or charge which provides for the above-described incentive feature. If, at step 54, it is determined that an incentive policy has not been chosen, the apparatus 100, at step 56, will calculate or formulate an insurance policy and corresponding premium without the incentive feature.

At step 57, the policy can then be presented to the individual and/or business entity for acceptance. The individual may then, at step 57, accept or reject the insurance policy. If, at step 57A, it is determined that the individual and/or business entity did not accept the policy, the processing will cease at step 58. If, at step 57A, it is determined that the individual and/or business entity accepted the policy, the parties will enter into the relevant insurance contract at step 59, typically with the payment of the policy premium or partial premium and the issuance of the insurance policy. The policy will then be issued. The policy will thereafter be in effect so as to protect the individual and/or business entity from liability for excess wear and tear and/or damage which may occur to the vehicle during the lease term. Upon the termination of the lease period, at step 60, the article will be inspected for excess wear and tear and/or damage.

At step 61, the value or repair amount and/or liability for any excess wear and tear and/or damage which may be found, will be calculated. If post-warranty coverage is in effect, the value for any post-warranty repairs will also be determined at step 61. At step 62, the apparatus 100 will then determine if the value of any excess wear and tear and/or damage is of such a magnitude to trigger policy coverage. The apparatus 100 will also, at step 62, determine if post-warranty coverage is triggered.

If, at step 62, policy coverage is triggered, the insurance provider or policy underwriter will, at step 63, assume responsibility for, and effect payment to the article owner and/or leasing entity for, the excess wear and tear and/or damage. The insurance provider or policy underwriter will also, at step 63, assume responsibility for, and effect payment for any post-warranty repairs, if such coverage is in effect. If, however, coverage is not triggered at step 62, the insurance provider or underwriter will, at step 64, have no liability to the article owner or leasing entity.

At step 65, it will be determined if an incentive policy is in effect. If no incentive policy is in effect, the operation of the apparatus and/or process will cease at step 66. If, at step 55, it is determined that an incentive policy is in effect, the apparatus 100 will, at step 67, determine the amount of the rebate and/or returned premium which is to be returned to the individual and/or business entity. At step 68, the individual and/or business entity will receive the rebate.

If no excess wear and tear and/or no damage has been found to exist, the individual and/or business entity will receive the full rebate amount at step 68. If excess wear and tear and/or damage has been found to exist at, or above, a pre-defined amount, the individual and/or business entity will receive no rebate at step 68. If excess wear and tear and/or damage has been found to exist below a pre-defined limit, a rebate amount will be calculated according to a pre-defined calculation and/or interpolation routine and the individual and/or business entity will receive the calculated amount at step 68.

In the preferred embodiment, a linear interpolation routine is utilized to calculate the partial rebate amount at step 68. It is important to note that any mathematical computation routine and/or interpolation routine, linear or non-linear, as well as any other method for calculating an amount or a partial amount, may be utilized in the processing scheme of the present invention. As noted above, rebate calculations will be performed during step 67.

Once the individual and/or business entity has been issued their or its rebate, the liability of the insurance provider and/or underwriter will cease at step 69. The operation and method of the present invention will then cease at step 70.

Figure 4A:
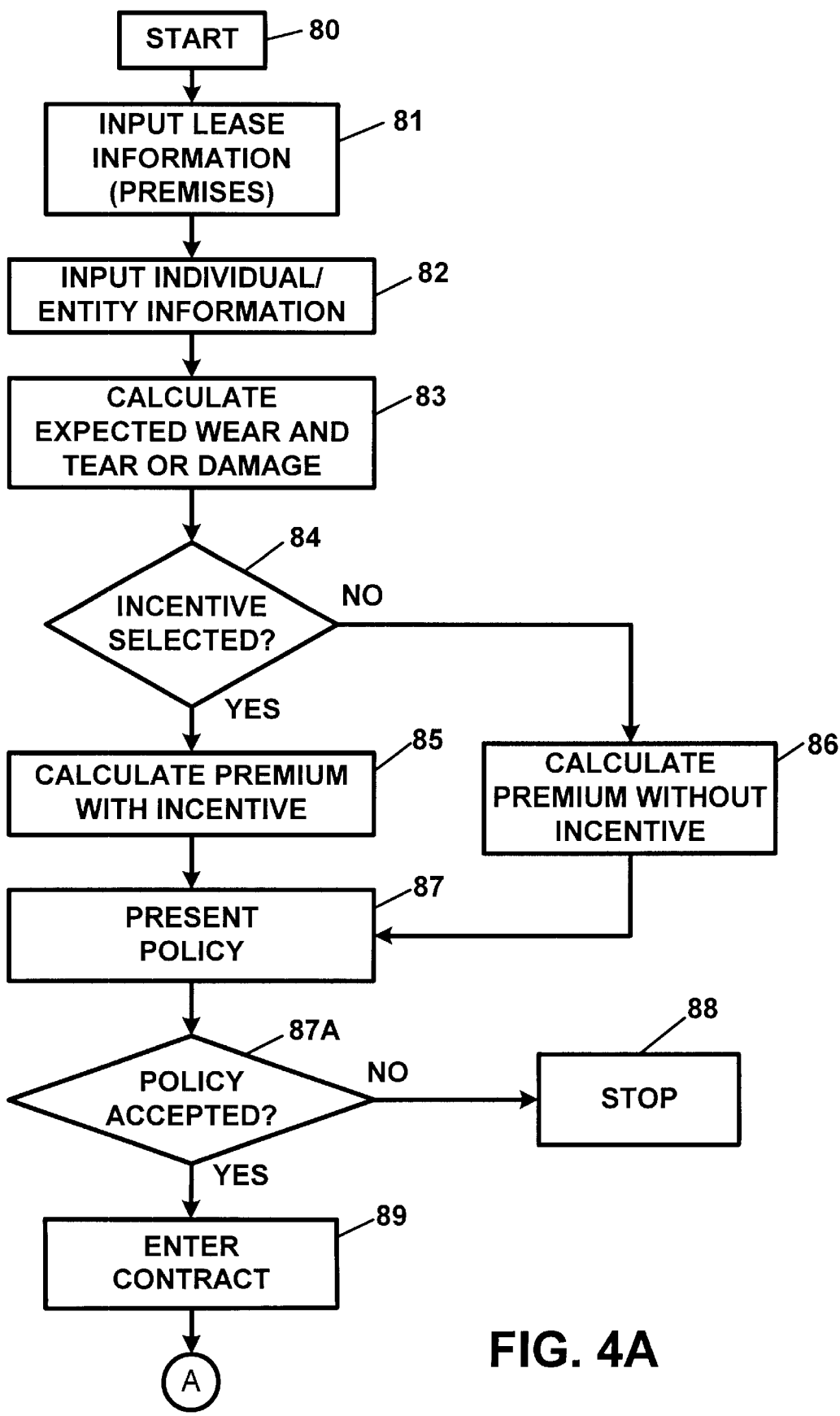
FIGS. 4A and 4B illustrate a flow chart of an alternate embodiment method of operation of the apparatus of FIG. 1.
Figure 4B:
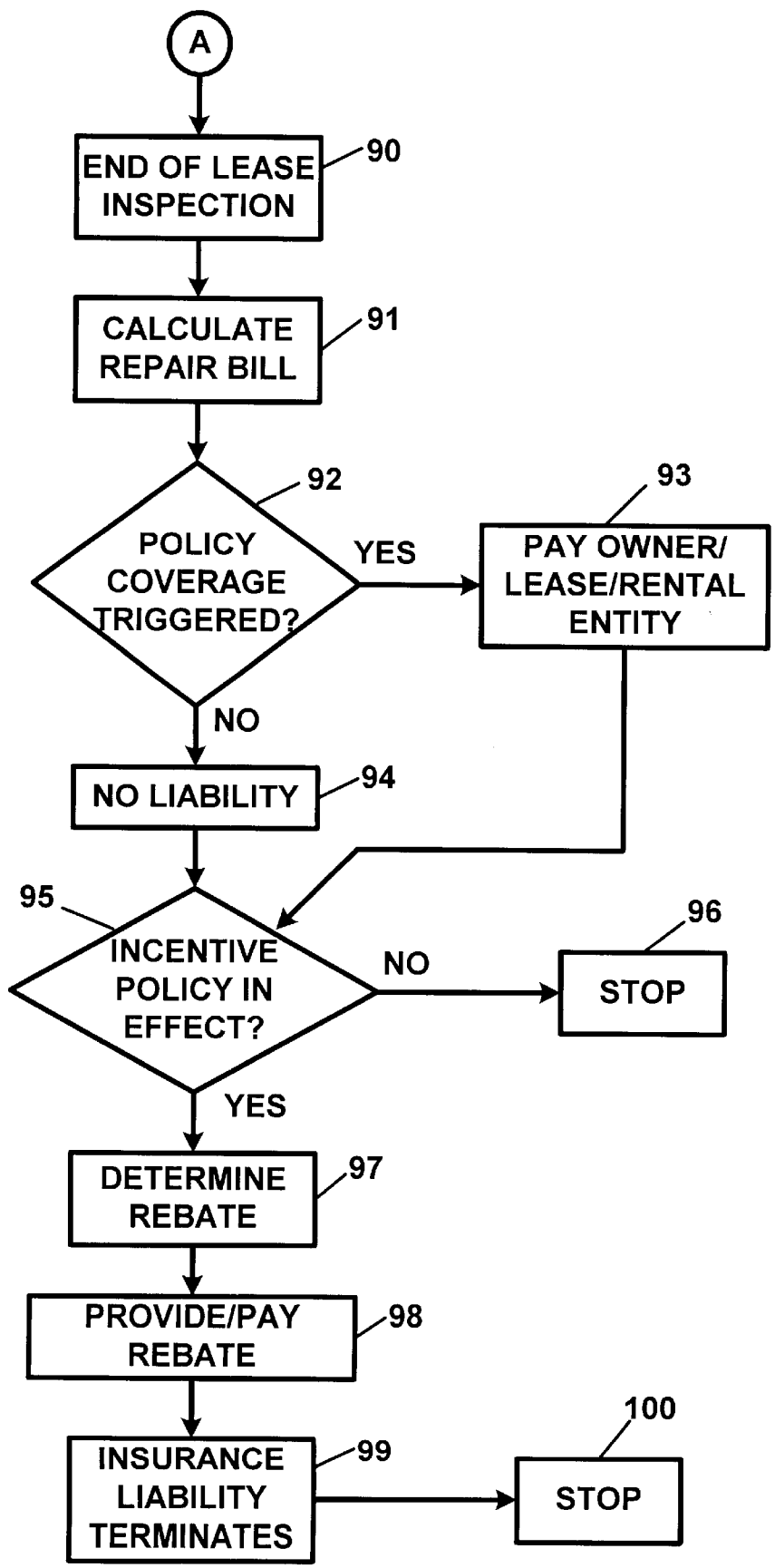

FIGS. 4A and 4B illustrate a flow chart of another alternate embodiment method of operation of the apparatus and method of the present invention which is utilized in conjunction with a leased and/or rented residential and/or commercial premises (hereinafter referred to as "premises").

In FIGS. 4A and 4B, the operation of the apparatus and/or method commences at step 80. At step 81, data and/or information pertaining to the type, age, make and model, along with lease or rental term, and any other pertinent information related to the lease or rental (i.e. use allowance, down payment, security payment, lease end purchase option and price, etc.) to be leased will be selected and input into the apparatus 100. Information pertaining to insurance coverage for post-warranty repairs, if desired, is also selected and input at step 81.

At step 82, data and/or information related to the individual or business entity who or which, respectively, will be leasing the premises (i.e. individual and/or business entity use or usage history, insurance history, past leasing history, desired insurance coverage, insurance deductible, insurance policy terms, etc.) will be entered into the apparatus 100. At step 82, the individual and/or business entity may or may not also select an insurance policy which provides for an incentive for maintaining the premises with no and/or minimum wear and tear and/or with no and/or minimum damage during the lease or rental term. In this regard, the individual and/or business entity may select to participate in an incentive policy agreement whereby the individual and/or business entity can receive a rebate and/or a return of a portion of the insurance policy's premiums and/or charges at the end of the lease or rental term if the premises is returned with no and/or minimal excess wear and tear and/or with no and/or minimal damage.

At step 83, the apparatus 100 will calculate expected excess wear and tear and/or damage, and/or information related to post-warranty repair, which is expected to occur during the lease term, given the data input at steps 81 and 82 along with the pertinent data and/or information which is stored in the database 7. The data and/or information which is stored in the database 7 and which is utilized in calculating an insurance premium and formulating the associated insurance policy may also include any one or more of data and/or information related to various damage and/or repairs which may need to be performed on, or for, the premises in question, the frequency with which these repairs had to be made in previous leases and/or rentals dealing with the same, identical and/or similar and/or analogous premises, the costs for repairing excessive wear and tear and/or damage, post-warranty repair data, data and/or information related to insurance premiums which data and/or information is utilized to calculate an associated insurance premium, the nature of the desired coverage, coverage deductibles, statistical information related to any of the above data and/or information as well as statistical information related to sex, age and use and usage histories for the individual and/or business entity as well as for individuals and/or business entities in the same, similar or analogous classes.

Database data and/or information also includes past lease or rental experiences, if any, for the individual or business entity as well as for individuals and/or business entities in the same, similar or analogous classes, records concerning any end of lease or end of rental damage which may have occurred in an individual's and/or business entity's past leasing relationships, or for those individuals and/or business entities in the same, similar or analogous classes and data and/or information related to lease and/or rental term.

At step 84, the apparatus 100 will determine whether the individual and/or business entity has chosen to participate in an insurance policy which provides for the above-described incentives. At step 84, if an incentive policy has been chosen, the apparatus 100, at step 85, will calculate or formulate an insurance policy and corresponding premium or charge which provides for the above-described incentive feature. If, at step 84, it is determined that an incentive policy has not been chosen, the apparatus 100, at step 86, will calculate or formulate an insurance policy and corresponding premium without the incentive feature.

At step 87, the policy can then be presented to the individual and/or business entity for acceptance. The individual may then, at step 87, accept or reject the insurance policy. If, at step 87A, it is determined that the individual and/or business entity did not accept the policy, the processing will cease at step 88. If, at step 87A, it is determined that the individual and/or business entity accepted the policy, the parties will enter into the relevant insurance contract at step 89, typically with the payment of the policy premium or partial premium and the issuance of the insurance policy. The policy will then be issued. The policy will thereafter be in effect so as to protect the individual and/or business entity from liability for excess wear and tear and/or damage which may occur to the premises during the lease or rental term. Upon the termination of the lease or rental period, at step 90, the premises will be inspected for excess wear and tear and/or damage.

At step 91, the value or repair amount and/or liability for any excess wear and tear and/or damage which may be found, will be calculated. If post-warranty coverage is in effect, the value for any post-warranty repairs will also be determined at step 91. At step 92, the apparatus 100 will then determine if the value of any excess wear and tear and/or damage is of such a magnitude to trigger policy coverage. The apparatus 100 will also, at step 92, determine if post-warranty coverage is triggered.

If, at step 92, coverage is triggered, the insurance provider or policy underwriter will, at step 93, assume responsibility for, and effect payment to the premises owner and/or leasing or renting entity for, the excess wear and tear and/or damage. The insurance provider or policy underwriter will also, at step 93, assume responsibility for, and effect payment for any post-warranty repairs, if such coverage is in effect. If, however, coverage is not triggered at step 92, the insurance provider or underwriter will, at step 94, have no liability to the premises owner and/or leasing or renting entity.

At step 95, it will be determined if an incentive policy is in effect. If no incentive policy is in effect, the operation of the apparatus and/or process will cease at step 96. If, at step 95, it is determined that an incentive policy is in effect, the apparatus 100 will, at step 97, determine the amount of the rebate and/or returned premium which is to be returned to the individual and/or business entity. At step 98, the individual and/or business entity will receive the rebate.

If no excess wear and tear and/or no damage has been found to exist, the individual and/or business entity will receive the full rebate amount at step 98. If excess wear and tear and/or damage has been found to exist at, or above, a pre-defined amount, the individual and/or business entity will receive no rebate at step 98. If excess wear and tear and/or damage has been found to exist below a pre-defined limit, a rebate amount will be calculated according to a pre-defined calculation and/or interpolation routine and the individual and/or business entity will receive the calculated amount at step 98.

In the preferred embodiment, a linear interpolation routine is utilized to calculate the partial rebate amount at step 98. It is important to note that any mathematical computation routine and/or interpolation routine, linear or non-linear, as well as any other method for calculating an amount, or a partial amount, may be utilized in the processing scheme of the present invention. As noted above, rebate calculations will be performed during step 97.

Once the individual and/or business entity has been issued their or its rebate, the liability of the insurance provider and/or underwriter will cease at step 99. The operation and method of the present invention will then cease at step 100.

The apparatus and method of the present invention may utilize any conventional techniques and/or insurance policy calculation and/or determination methods, in performing any of the processing functions described herein. The above-described methods, in the preferred embodiment, are implemented with computer programs and/or software programs. It is also noted that the method of the present invention may also be practiced manually and/or without a computer.

Figure 5:
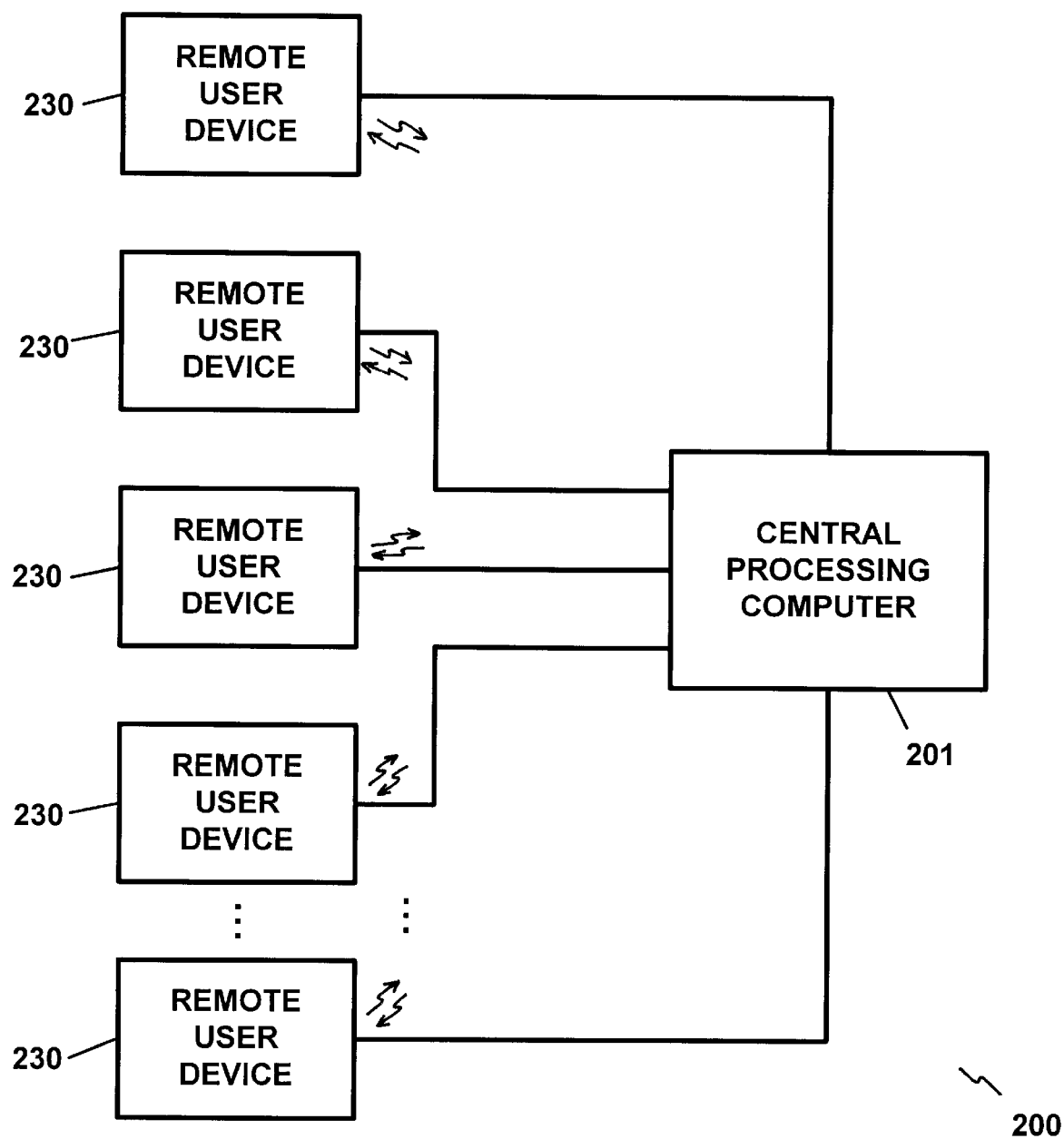
FIG. 5 illustrates an alternate embodiment of the apparatus of the present invention which is utilized in a network environment.

In an alternate embodiment, the apparatus of the present invention is utilized in a network environment so as to provide insurance policies, products, services and/or coverage in a network environment such as on, or over, the Internet, the World Wide Web and/or any other communications network and/or system. FIG. 5 illustrates the apparatus of the present invention in an alternate embodiment wherein the apparatus is utilized in conjunction with a communications network.

FIG. 5 illustrates a block diagram of an alternate embodiment of the apparatus of the present invention which is denoted generally by the reference numeral 200. As illustrated in FIG. 5, the apparatus 200 comprises a central processing computer 201 and a plurality of remote user computers, terminals and/or communication devices 230 (hereinafter referred to as "remote user device 230"). The central processing computer 201 may be a personal computer, a server computer, a workstation computer, a mainframe computer, a minicomputer or any other suitable computer processing system which is utilized in a network environment. The central processing computer 201 comprises all essential network devices and/or network interfacing devices, etc., for facilitating network operation.

Each of the remote user devices 230 is connected and/or linked with the central processing computer 201 via a communication network or medium. In the preferred embodiment, the communication network or medium is a telecommunication and/or telephone communication network. The telecommunication and/or telephone network may be a line-connected communication network and/or a wireless communication network. In an alternate embodiment, the apparatus 200 is utilized in conjunction with a local area network (LAN), a wide area network (WAN), a value added network (VAN) or any other communication network. In yet another alternate embodiment, the apparatus 200 is utilized on, or over, and/or in conjunction with, the Internet and/or the World Wide Web.

It is important to note that the communication network and/or medium which may be utilized in conjunction with the apparatus and method of the present invention may be any suitable communication system and/or network for transmitting information and/or data, including multimedia, video, and/or audio information and/or data, or any other suitable information and/or data. In this regard, the communication network and/or medium may be a radio communication network or system, a digital communication network or system, a satellite communication network or system, a cable television communication network or system, a personal communications services (PCs) network or system, a telecommunication network or system, an optical communication network or system, and/or any other suitable communication network(s) and/or system(s), and/or any combination(s) thereof.

The communications system utilized may operate anywhere in the electromagnetic and/or radio signal frequency spectrum. As noted above, wireless communication networks and associated wireless communications devices, including wireless modems, may be utilized in conjunction with the present invention.

It is also important to note that the central processing computer 201 and remote user device (s) 230, which may be utilized, in the preferred embodiment, are equipped with the respective and/or corresponding communication equipment for transmitting and/or receiving the signals, data and/or information associated with the utilized communication network, and/or system, and/or any combination(s) thereof.

In the preferred embodiment, the central processing computer 201 is a typical central processing and/or server computer such as those utilized in conjunction with an on-line service and/or in network environments such as those utilized in conjunction with the Internet, the World Wide Web and/or any other suitable communication network or network environment. In the preferred embodiment, the remote user device 230 is a personal computer (PC) which may be a home or personal computer and/or a laptop computer.

While a personal computer is described as being utilized in the preferred embodiment, it is also envisioned that the remote user device 230 or devices may also be any suitable communication device, such as a personal communication device and/or a personal communication services (PCS) device, a personal digital assistant, a video telephone, a cellular telephone, a line-connected telephone, a wireless or cordless telephone, a digital communication device, a digital telephone, a digital television and/or an interactive television and/or any other suitable communication device. In this regard, the present invention may be utilized with any suitable device(s) for facilitating communications and/or data and/or information transfer in conjunction with the central processing computer 201 in any suitable communications and/or network environment.

The apparatus 200 is utilized in the same manner as described above with regards to FIGS. 1 to 4 so as to provide access to the apparatus and method of the present invention by remote users. In this regard any user may access the central processing computer 201 from any remote computer, terminal and/or other suitable communication device, so as to perform any of the herein-described processing routines for processing and calculating an insurance premium, plan or policy. In this regard, a central database (not shown) which is located at the central processing computer 201 would contain all of the data and/or information which is stored in the database 7 of the embodiment of FIG. 1 as described above. Further, the apparatus and method of the present invention facilitates on-line and/or network dissemination of insurance policies, products, services and/or coverage so as to allow an individual and/or business entity to obtain insurance and/or information related thereto for leased and/or rented entities, from a remote location on, or over, a network environment, such as on, or over, the Internet, the World Wide Web, and/or any other suitable communication network.

While the present invention has been described and illustrated in various preferred and alternate embodiments, such descriptions are merely illustrative of the present invention and are not to be construed to be limitations thereof. In this regard, the present invention encompasses all modifications, variations and/or alternate embodiments with the scope of the present invention being limited only by the claims which follow.

What is claimed is:

1. An apparatus for processing lease insurance information, comprising:
    a memory device for storing a first data set, wherein said first data set contains information for generating at least one of an insurance premium and an insurance policy for providing insurance for excess wear and tear for a leased entity;
    a processor for processing said first data set in conjunction with a second data set and a third data set, wherein said second data set contains information regarding at least one of the entity to be leased and a term of the lease, and wherein said third data set contains information regarding at least one of a driving history of a leasing individual, a driving history of a leasing entity, a usage history of a leasing individual, a usage history of a leasing entity, an insurance history of a leasing individual, an insurance history of a leasing entity, a past leasing history of a leasing individual, a past leasing history of a leasing entity, a desired lease insurance coverage, a lease insurance deductible, and a lease insurance polivy term, and further wherein said processor generates a fourth data set containing said at least one of an insurance premium and an insurance policy for providing insurance for excess wear and tear for the leased entity; and
    a device for at least one of displaying and outputting information contained in at least one of said fourth data set, said insurance premium, and said insurance policy.

2. The apparatus of claim 1, wherein the leased entity is one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, and an article of commercial property.

3. The apparatus of claim 1, wherein said memory device further stores information related to one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, an article of commercial property, an individual, a business entity, a repair cost, a replacement cost, a probability of damage, a probability of post-warranty repair, historical leasing information, one of locality, regional, geographical, and seasonal, information corresponding to the lease, a usage pattern, a usage habit, a manufacturer's warranty, a lease term, a lease duration, historical repair information, repair frequency information, insurance policy information, insurance premium information, insurance product information, insurance service information, an insurance premium rebate incentive program, insurance premium rebate incentive information, actuarial information, statistical information, risk information, and risk of loss information.

4. The apparatus of claim 1, wherein said third data set contains information regarding an insurance premium rebate incentive, and further wherein said processor generates said forth data set containing at least one of information, an insurance premium, and an insurance policy, containing at least one of a premium rebate incentive feature and a premium rebate incentive provision.

5. The apparatus of claim 4, wherein said processor determines whether said at least one of a premium rebate incentive feature and a premium rebate incentive provision is in effect, and further wherein said processor calculates an amount of an insurance premium to be refunded.

6. The apparatus of claim 1, further comprising:
    an input device for inputting information contained in at least one of said first data set, said second data set, and said third data set,
    and further wherein said one of a display device and an output device facilitates a presentation of at least one of information contained in said fourth data set, said insurance premium, and said insurance policy, to a prospective policy holder.

7. The apparatus of claim 1, further comprising:
    a receiver for receiving a request for information contained in at least one of said first data set, said second data set, said third data set, and said fourth data set, from a remote communication device; and
    a transmitter for transmitting information contained in at least one of said first data set, said second data set, said third data set, and said forth data set, to the remote communication device in response to said request.

8. The apparatus of claim 1, wherein said processor calculates an insurance premium for a lease insurance policy for excess wear and tear coverage based upon at least one of the leasing individual the leasing entity, a driving history of the leasing individual, a driving history of the leasing entity, a usage history of the leasing individual, a usage history of the leasing entity, an insurance history of the leasing individual, an insurance history of the leasing entity, a past leasing history of the leasing individual, a past leasing history of the leasing entity, a desired lease insurance coverage, an insurance deductible, and a policy term.

9. A method for processing lease insurance information, comprising:

storing a first data set, wherein said first data set contains information for generating at least one of an insurance premium and an insurance policy for providing insurance for excess wear and tear for a leased entity;

processing said first data set in conjunction with a second data set and a third data set, wherein said second data set contains information regarding at least one of the entity to be leased and a term of the lease, and wherein said third data set contains information regarding at least one of a driving history of a leasing individual, a driving history of a leasing entity, a usage history of a leasing individual, a usage history of a leasing entity, an insurance history of a leasing individual, an insurance history of a leasing entity, a past leasing history of a leasing individual, a past leasing history of a leasing entity, a desired lease insurance coverage, a lease insurance deductible, and a lease insurance policy term;

generating a fourth data set containing said at least one of an insurance premium and an insurance policy for providing insurance for excess wear and tear for the leased entity; and at least one of displaying and outputting information contained in at least one of said fourth data set, said insurance premium, and said insurance policy.

10. The method of claim 9, wherein said third data set contains information regarding an insurance premium rebate incentive, and further wherein said method further comprises:

generating said forth data set containing at least one of information, an insurance premium, and an insurance policy, containing at least one of a premium rebate incentive feature and a premium rebate incentive provision.

11. The method of claim 9, further comprising:

determining whether said at least one of a premium rebate incentive feature and a premium rebate incentive provision is in effect; and calculating an amount of an insurance premium to be refunded.

12. The method of claim 9, further comprising:

inputting information contained in at least one of said first data set, said second data set, and said third data set; and presenting at least one of information contained in said fourth data set, said insurance premium, and said insurance policy, to a prospective policy holder.

13. The method of claim 9, further comprising:

receiving a request for information contained in at least one of said first data set, said second data set, said third data set, and said fourth data set, from a remote communication device; and transmitting said information contained in at least one of said first data set, said second data set, said third data set, and said fourth data set, to the remote communication device in response to said request.

14. The method of claim 9, wherein the leased entity is one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, and an article of commercial property, and further wherein said method further comprises:

storing information related to one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, an article of commercial property, an individual, a business entity, a repair cost, a replacement cost, a probability of damage, a probability of post-warranty repair, historical leasing information, one of locality, regional, geographical, and seasonal, information corresponding to the lease, a usage pattern, a usage habit, a manufacturer's warranty, a lease term, a lease duration, historical repair information, repair frequency information, insurance policy information, insurance premium information, insurance product information, insurance service information, an insurance premium rebate incentive program, insurance premium rebate incentive information, actuarial information, statistical information, risk information, and risk of lose information.

15. An apparatus for processing lease insurance information, comprising:

a memory device for storing a first data set, wherein said first data set contains information for generating at least one of an insurance premium and an insurance policy for providing insurance for post-warranty repairs for a leased entity;

a processor for processing said first data set in conjunction with a second data set and a third data set, wherein said second data set contains information regarding at least one of the entity to be leased and a term of the lease, and wherein said third data set contains information regarding at least one of a driving history of a leasing individual, a driving history of a leasing entity, a usage history of a leasing individual, a usage history of a leasing entity, an insurance history of a leasing individual, an insurance history of a leasing entity, a past leasing history of a leasing individual, a past leasing history of a leasing entity, a desired lease insurance coverage, a lease insurance deductible, and a lease insurance policy term, and further wherein said processor generates a fourth data set containing said at least one of an insurance premium and an insurance policy for providing insurance for post-warranty repairs for the leased entity; and a device for at least one of displaying and outputting information contained in at least one of said fourth data set, said insurance premium, and said insurance policy.

16. The apparatus of claim 15, wherein the leased entity is one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, and an article of commercial property.

17. The apparatus of claim 15, wherein said memory device further stores information related to one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, an article of commercial property, an individual, a business entity, a repair cost, a replacement cost, a probability of damage, a probability of post-warranty repair, historical leasing information, one of locality, regional, geographical, and seasonal, information corresponding to the lease, a usage pattern, a usage habit, a manufacturer's warranty, a lease term, a lease duration, historical repair information, repair frequency information, insurance policy information, insurance premium information, insurance product information, insurance service information, an insurance premium rebate incentive program, insurance premium rebate incentive information, actuarial information, statistical information, risk information, and risk of loss information.

18. The apparatus of claim 15, wherein said third data set contains information regarding an insurance premium rebate incentive, and further wherein said processor generates said forth data set containing at least one of information, an insurance premium, and an insurance policy, containing at least one of a premium rebate incentive feature and a premium rebate incentive provision.

19. The apparatus of claim 18, wherein said processor determines whether said at least one of a premium rebate incentive feature and a premium rebate incentive provision is in effect, and further wherein said processor calculates an amount of an insurance premium to be refunded.

20. The apparatus of claim 15, further comprising:
an input device for inputting information contained in at least one of said first data set, said second data set, and said third data set,
and further wherein said one of a display device and an output device facilitates a presentation of at least one of information contained in said fourth data set, said insurance premium, and said insurance policy, to a prospective policy holder.

21. The apparatus of claim 15, further comprising:
a receiver for receiving a request for information contained in at least one of said first data set, said second data set, said third data set, and said fourth data set, from a remote communication device; and
a transmitter for transmitting information contained in at least one of said first data set, said second data set, said third data set, and said fourth data set, to the remote communication device in response to said request.

22. The apparatus of claim 15, wherein said lease insurance provides insurance protection for post-warranty repairs for the term of the lease subsequent from the expiration of a warranty period and up to the lease termination.

23. The apparatus of claim 15, wherein said processor calculates an insurance premium for a lease insurance policy for post-warranty repairs coverage based upon at least one of the leasing individual, the leasing entity, a driving history of the leasing individual, a driving history of the leasing entity, a usage history of the leasing individual, a usage history of the leasing entity, an insurance history of the leasing individual, an insurance history of the leasing entity, a past leasing history of the leasing individual, a past leasing history of the leasing entity, a desired lease insurance coverage, an insurance deductible, and a policy term.

24. A method for processing lease insurance information, comprising:
storing a first data set, wherein said first data set contains information for generating at least one of an insurance premium and an insurance policy for providing insurance for post-warranty repairs for a leased entity;
processing said first data set in conjunction with a second data set and a third data set, wherein said second data set contains information regarding at least one of the entity to be leased and a term of the lease, and wherein said third data set contains information regarding at least one of a driving history of a leasing individual, a driving history of a leasing entity, a usage history of a leasing individual, a usage history of a leasing entity, an insurance history of a leasing individual, an insurance history of a leasing entity, a past leasing history of a leasing individual, a past leasing history of a leasing entity, a desired lease insurance coverage, a lease insurance deductible, and a lease insurance policy term;
generating a fourth data set containing said at least one of an insurance premium and an insurance policy for providing insurance for post-warranty repairs for the leased entity; and
at least one of displaying and outputting information contained in at least one of said fourth data set, said insurance premium, and said insurance policy.

25. The method of claim 24, wherein the leased entity is one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, and an article of commercial property, and further wherein said method further comprises:
storing information related to one of a vehicle, a motor vehicle, a truck, construction equipment, farm equipment, a boat, a recreational vehicle, an airplane, an aircraft, a motorcycle, office equipment, a computer, computer equipment, a residential premises, a commercial premises, an article of personal property, an article of commercial property, an individual, a business entity, a repair cost, a replacement cost, a probability of damage, a probability of post-warranty repair, historical leasing information, one of locality, regional, geographical, and seasonal, information corresponding to the lease, a usage pattern, a usage habit, a manufacturer's warranty, a lease term, a lease duration, historical repair information, repair frequency information, insurance policy information, insurance premium information, insurance product information, insurance service information, an insurance premium rebate incentive program, insurance premium rebate incentive information, actuarial information, statistical information, risk information, and risk of loss information.

26. The method of claim 24, wherein said third data set contains information regarding an insurance premium rebate incentive, and further wherein said method further comprises:
generating said forth data set containing at least one of information, an insurance premium, and an insurance policy, containing at least one of a premium rebate incentive feature and a premium rebate incentive provision.

27. The method of claim 24, further comprising:
determining whether said at least one of a premium rebate incentive feature and a premium rebate incentive provision is in effect; and
calculating an amount of an insurance premium to be refunded.

28. The method of claim 24, further comprising:
inputting information contained in at least one of said first data set, said second data set, and said third data set; and presenting at least one of information contained in said fourth data set, said insurance premium, and said insurance policy, to a prospective policy holder.

29. The method of claim 24, further comprising:

receiving a request for information contained in at least one of said first data set, said second data set, said third data set, and said fourth data set, from a remote communication device; and transmitting information contained in at least one of said first data set, said second data set, said third data set, and said fourth data set, to the remote communication device in response to said request.

30. The apparatus of claim 24, wherein said lease insurance provides insurance protection for post-warranty repairs for the term of the lease subsequent from the expiration of a warranty period and up to the lease termination.

31. A computer-implemented method for processing lease insurance information, comprising:

storing a first data set, wherein said first data set contains information for generating at least one of an insurance premium and an insurance policy for providing insurance for at least one of excess wear and tear for a leased entity and post-warranty repairs for a leased entity;

processing said first data set in conjunction with a second data set and a third data set, wherein said second data set contains information regarding at least one of the entity to be leased and a term of the lease, and wherein said third data set contains information regarding at least one of an insurance history of a leasing individual and an insurance history of a leasing entity;

generating a fourth data set containing said at least one of an insurance premium and an insurance policy for providing insurance for at least one of excess wear and tear for the leased entity and post-warranty repairs for the leased entity; and at least one of displaying and outputting information contained in at least one of said fourth data set, said insurance premium, and said insurance policy.

* * * * *